Aug. 17, 1943.　　F. B. BRATEK ET AL　　2,327,167
CARCASS SAW
Filed Sept. 11, 1939　　2 Sheets-Sheet 1
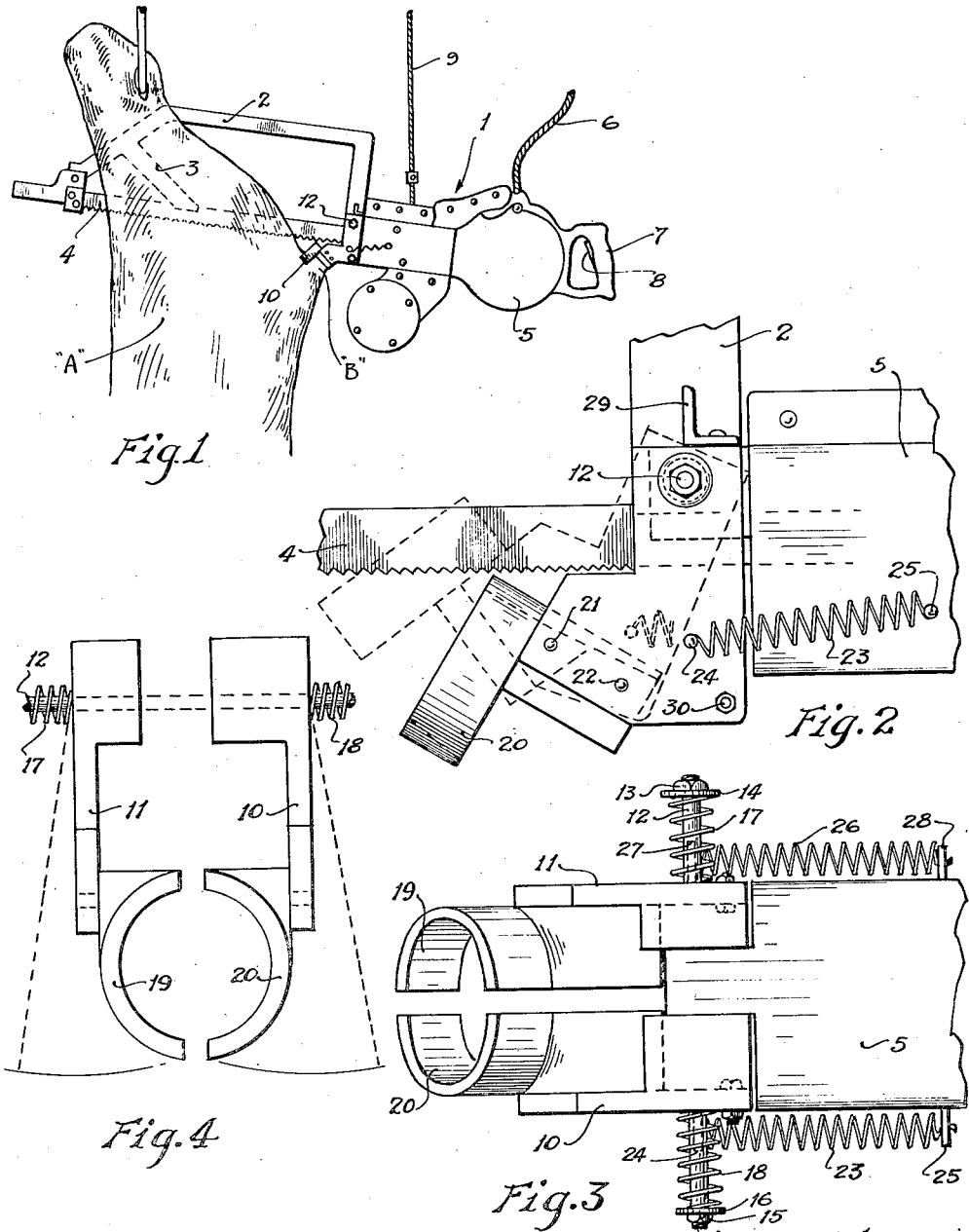
Frank B. Bratek and
Andrew S. Hartanov
INVENTOR Aug. 17, 1943.  F. B. BRATEK ET AL  2,327,167
CARCASS SAW
Filed Sept. 11, 1939    2 Sheets-Sheet 2
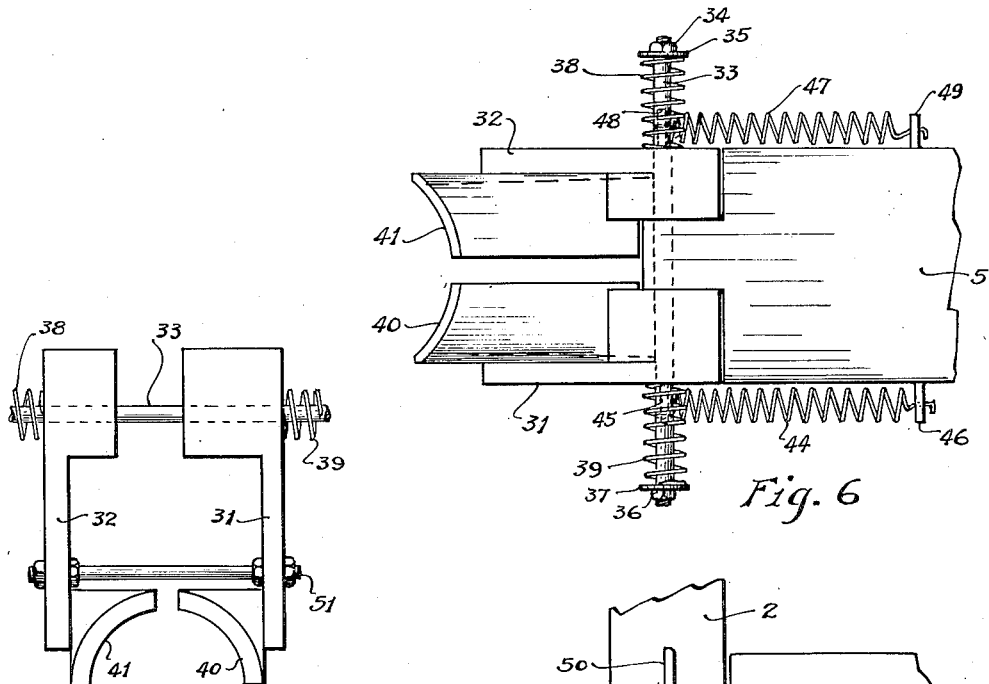
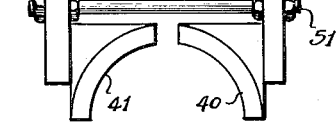
Fig. 7
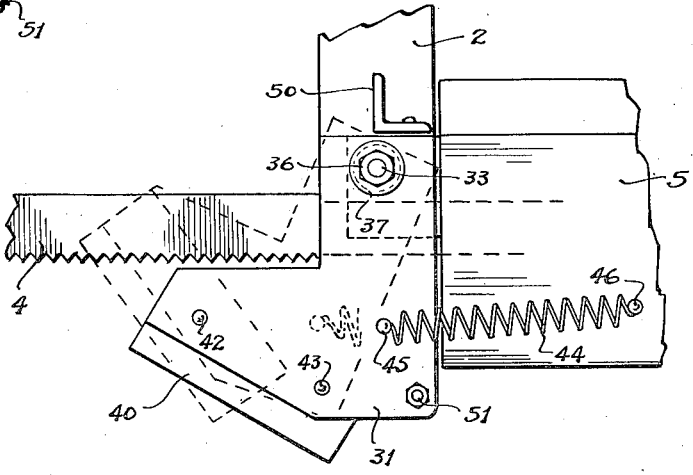
Fig. 5
Frank B. Bratek and
Andrew S. Hartanov
INVENTOR Patented Aug. 17, 1943

2,327,167

UNITED STATES PATENT OFFICE 2,327,167

CARCASS SAW

Frank B. Bratek and Andrew S. Hartanov, Chicago, Ill., assignors to Industrial Patents Corporation, Chicago, Ill., a corporation of Delaware Application September 11, 1939, Serial No. 294,380

17 Claims. (Cl. 17—23)

This invention relates to a guide means for a power operated saw.

One of the objects of this invention is to provide an improved guide means for a power operated carcass saw.

Another object of this invention is to provide a movable guide means for a power operated carcass saw, permitting the guide means to be withdrawn as sawing progresses.

Other objects of the invention will be apparent from the description and claims which follow.

It is customary packing house practice to split the carcass of a slaughtered animal, especially a beef carcass, down the backbone at the time of killing and dressing. This is ordinarily done while the whole carcass is hanging by the stump of the hind legs, and usually, in the case of beef, after the tail has been partially severed from the carcass. The splitting of the carcass into two halves is ordinarily started by a saw. It would, of course, be possible to complete the splitting with a saw but many packers prefer to finish with a cleaver. In either method, a very important step is starting the division down the center of the backbone. The ordinary power operated saws used for this purpose have had no satisfactory attachment for centering the saw on the backbone, with the result that much depends upon the skill of the operator in starting the cut down the middle of the spine.

The present invention tends to overcome the difficulty by automatically centering the saw over the backbone, so that when the saw is started, it will cut in the proper place.

Two preferred embodiments of the invention are shown in the accompanying drawings which form a part of this specification and in which like reference characters in the several figures designate similar elements.

Figure 1 is a side view of a power operated carcass saw utilizing the present invention and placed in contact with the carcass to begin sawing the backbone.

Figure 2 is a side view of the centering device disclosed in this application adapted for use with carcasses from which the tail has been removed.

Figure 3 is a top view of the device shown in Figure 2.

Figure 4 is a front view of the device shown in Figure 2.

Figure 5 is a side view of the centering device disclosed in the present application adapted for use with carcasses from which the tail has not been removed.

Figure 6 is a top view of the device shown in Figure 5.

Figure 7 is a front view of the device shown in Figure 5.

Figure 1 shows a side view of a carcass A with a power operated carcass saw 1 equipped with the present invention placed upon the tail stump B of the carcass. The power operated carcass saw 1 comprises three principal parts: a frame 2 to which is rigidly affixed intermediate guide means 3, a reciprocable saw blade 4, which reciprocates in slots in the intermediate guide means 3 and in the extremities of the frame 2, an electric motor, not shown, and gears, not shown, which are enclosed in a housing 5. The motor required to operate the saw is supplied with power through an electric cord 6. The saw is supplied with a handle 7 in which is contained a switch 8. Due to the great weight of such a power operated saw 1 the entire device is suspended by means of cord 9, which runs over a pulley, not shown, and to the other end of which is attached a counterweight, not shown. A saw of the type hereinabove described is admittedly not new and no invention is claimed on such a device alone.

Figures 2, 3, and 4 disclose one form of the guide means of the present invention adapted to be used on carcasses from which the tail has been removed, leaving only a short tail stump on the carcass. The guide means comprises two brackets 10 and 11, one end of each of which is pivoted to the saw frame 2 by means of a relatively long bolt 12, threaded at both ends, at one end of which is a nut 13 and a washer 14 and at the other end of which is another nut 15 and another washer 16. Intermediate between one washer 14 and the adjacent bracket 11 is a compression spring 17 and between the other washer 16 and its adjacent bracket 10 is a compression spring 18. The other end of the brackets terminate in substantially semicircular faces 19 and 20, which, together, substantially form a split ring, each half of which may either be manufactured as part of the bracket itself or may be manufactured separately and attached to the respective brackets by any suitable means, as by rivets 21 and 22. A tension spring 23 is attached to a pin 24 on one bracket 10 and to a pin 25 on the housing 5. Similarly, another tension spring 26 may be attached to a pin 27 on the other bracket 11 and to a pin 28 on the housing 5. An obstruction 29 may be placed on the frame 2 to limit movement of the brackets 10 and 11.

It may sometimes be desirable to prevent expansion of the two guide means, which can easily be secured by bolting the two together, as by bolt 30.

Figures 5, 6, and 7 disclose another embodiment of the guide means which is adaptable for use on carcasses from which the tail is not wholly severed. This embodiment comprises two brackets 31 and 32 each of which is pivotally attached to the frame 2 of the saw 1 by means of a relatively long bolt 33 threaded at both ends at one of which is a nut 34 and a washer 35 and at the other end of which is another nut 36 and another washer 37. Between the one washer 35 and the adjacent bracket 32 is placed a compression spring 38 around the bolt 33. Similarly, another compression spring 39 is placed around the other end of the bolt 33 between the bracket 31 and the washer 37. The other ends of the brackets 31 and 32 terminate in arcuate faces 40 and 41, which may either be integral with the brackets or affixed thereto by any suitable means, such as rivets 42 and 43. Tension spring 44 connecting bracket 31 to the housing 5, one end being attached to pin 45 on the bracket and the other to pin 46 on the housing, and tension spring 47 connecting bracket 32 to the housing 5, one end being attached to pin 48 on the bracket and the other to pin 49 on the housing, hold the lever arms 31 and 32 back against the housing. An obstruction 50 may be placed upon the frame 2 to limit movement of the brackets 31 and 32. If it is desired to avoid spreading of the brackets, the two may be bolted together as by bolt 51.

In the embodiment shown in Figures 2, 3, and 4, one bracket is pivotally attached to each side of the frame 2 and the semicircular faces 19 and 20 are spaced to permit reciprocation of saw blade 4 therebetween. Similarly, in the embodiment shown in Figures 5, 6, and 7 the brackets 31 and 32 are pivotally attached to the frame 2 as above described and the arcuate faces 40 and 41 are spaced to permit reciprocation of saw blade 4 therebetween. In the operation of a carcass saw equipped with the first guide device, the semicircular faces are placed around and substantially encircle the tail stump B, and in the other embodiment, the arcuate faces are placed firmly against the tail portion of the carcass, by merely bringing the saw 1 down upon the tail portion of the carcass A. The saw is then started by pressure upon the switch 8 and rapidly cuts down through the center of the backbone of the carcass. The angle of the brackets with the saw will, of course, depend upon the relative height of the operator and the carcass. In the embodiment shown in Figures 2, 3, and 4, the faces substantially encircle the tail stump B, and the brackets will pivot as the saw starts to cut. As cutting further progresses, the brackets will tend to spread as the saw is brought down the backbone. In the other embodiment of the device, the arcuate faces of the guide means are placed firmly against the tail portion B of the carcass, the operation of the saw is started, and the guide portion may follow down the spine for a considerable distance. In either embodiment, the operator may permit the brackets to be snapped back against the housing by pulling the saw slightly towards him, thereby relieving the contact between the guide means and the carcass. It will readily be apparent that the pressure to be exerted by the compression springs 17 and 18, or 38 and 39, as the case may be, may easily be adjusted by tightening or loosening the respective nuts.

It will be seen that the present invention facilitates the centering of the saw upon the backbone of the carcass and automatically places the saw in the proper position for starting the cut down the backbone. It will thereby not only improve the quality of work done but will save the operator time and energy and will avoid any necessity of placing the hand near the reciprocating blade.

It will be readily apparent that the device of this invention may be employed in any operation in which it is desired to saw a plurality of objects in the same relative place, to center other operations upon particular objects, and for other purposes which will readily suggest themselves to persons skilled in the art.

We claim:

1. A power operated saw comprising a frame, a reciprocable saw blade, a motor, brackets, said brackets being pivotally and expansibly attached to said frame on each side of said blade, said brackets terminating in opposing arcuate faced ends, compression members to oppose expansion of said brackets, and tension members to oppose pivoting of said brackets.

2. A guide means for a power operated saw, said saw comprising a frame, a reciprocable saw blade and a motor, said guide means comprising arcuate faced brackets on each side of said saw blade spaced to permit reciprocation of said saw blade therebetween, pivotally attached to said saw by means of a relatively long bolt through said frame, compression members between the ends of said bolt and said brackets, and tension means between said brackets and said frame.

3. In combination with a power operated saw comprising a frame, a reciprocable saw blade and a motor for reciprocating the saw, means for holding the article to be sawed comprising brackets, said brackets being pivotally attached to the frame on each side thereof, said brackets pivoting in planes parallel to the plane of said blade, and said brackets having opposed arcuate faces disposed so as to substantially encircle an article placed therebetween and spaced to permit the saw blade to operate therebetween.

4. In combination with a power operated saw comprising a frame, a reciprocable saw blade and a motor for reciprocating the saw, a centering device comprising brackets having opposed arcuate faces, said brackets being pivotally attached to the saw frame, said brackets pivoting in planes parallel to the plane of said blade, said faces being adapted to partially encircle an object to be sawed and spaced to permit the saw blade to operate therebetween.

5. In combination with a carcass saw comprising a frame, a reciprocable saw blade and a motor for reciprocating the saw, a guide means for said saw comprising semi-circular faced brackets, said brackets being pivotally attached to the said frame, said brackets pivoting in planes parallel to the plane of said blade, said semi-circular shaped brackets facing each other and being disposed to substantially encircle the tail portion of a carcass and permit the saw to operate therebetween.

6. A guide means for a power operated saw, said saw comprising a frame, a reciprocable saw blade and a motor for reciprocating the saw, said guide means comprising arcuate faced brackets, said brackets being disposed with one on each side of the saw blade, said brackets being spaced to permit reciprocation of said saw blade between said arcuate faces, and said brackets being attached to said saw frame adjacent to said saw in a manner to permit pivoting in planes parallel to the plane of said blade, and a tension means between the said brackets and said frame to oppose pivoting of said brackets.

7. A hand implement comprising a saw, and spaced means including guide portions movably affixed with respect to the saw, said means being adapted to have engagement with the periphery of a longitudinally extending article under manual pressure and to have said guide portions in contact with the periphery of the article, said saw being operative between said spaced guides to cut the article longitudinally, said guide means cooperating under manual pressure with said saw and the article to fix the direction of the article's approach to the saw in two directions to control the direction of the saw cut as the saw moves relative to the guide.

8. A hand element comprising a saw, and spaced means including guide portions pivotally mounted with respect to the saw and expansibly mounted with respect to each other, said means being adapted to have engagement with the periphery of a longitudinally extending article under manual pressure and to have said guide portions in contact with the periphery of the article, said saw being operative between said spaced guides to cut the article longitudinally, said guide means cooperating under manual pressure with said saw and the article to control the direction of its cut as the saw moves relative to the guide.

9. A hand implement comprising a power driven saw, and spaced means including guide portions movably affixed with respect to the saw, said means being adapted to have engagement with and to partially encircle the periphery of a longitudinally extending article under manual pressure, said saw being operative between said spaced guides to cut the article longitudinally, said guide means cooperating under manual pressure with said saw and the article to fix the direction of the article's approach to the saw in two directions to control the direction of the saw cut as the saw moves relative to the guide.

10. A hand implement comprising a power driven carcass saw, and spaced means including guide portions movably affixed with respect to the saw, said means being adapted to have engagement with the periphery of the backbone of a carcass under manual pressure and to have said guide portions in contact with the periphery of the backbone, said guide portions including relatively wide surface areas maintained in a plane parallel to the plane of the saw, said saw being operative between said spaced guides to cut the backbone longitudinally, said guide means cooperating under manual pressure with said saw and the backbone to control the direction of its cut as the saw moves relative to the guide.

11. A hand implement comprising a saw, and spaced means including guide portions pivotally affixed with respect to the saw for movement in more than one direction, resilient means for urging the spaced means around the pivot in each direction of movement, said spaced means being adapted to have engagement with the periphery of a longitudinally extending article under manual pressure and to have said guide portions in contact with the periphery of the article, said resilient means permitting said spaced means to expand to accommodate articles of varying sizes and being also effective to bias said spaced means around the pivot and out of the zone of operations when the spaced means are released from contact with the article, said saw being operative between said spaced guides to cut the article longitudinally, said guide means cooperating under manual pressure with said saw and the article to control the directions of its cut as the saw moves relative to the guide and while the spaced means are in contact with the article.

12. A saw comprising a frame, a reciprocable saw blade, brackets pivotally and expansibly attached to said frame on each side of said blade, said brackets terminating in opposed arcuate faced ends, compression members to oppose expansion, and tension members to oppose pivoting.

13. A guide means for a saw, said saw having a frame, a reciprocable saw blade, said guide means comprising arcuate faced brackets on each side of said saw blade spaced to permit reciprocation of said saw blade therebetween, said guide means being pivotally attached to said saw by means of a relatively long bolt through said frame, compression members between the ends of said bolt and said brackets, and tension means between said brackets and said frame.

14. A cutting implement comprising a saw having a cutting blade supported in a frame, means for holding the article to be sawed comprising brackets pivotally attached to the frame on each side thereof, said brackets pivoting in planes parallel to the plane of said blade, and said brackets having opposed arcuate faces disposed so as to substantially encircle an article placed therebetween and spaced to permit the saw blade to operate therebetween.

15. A cutting implement comprising a saw having a cutting blade supported in a frame, a centering device comprising brackets having opposed arcuate faces pivotally attached to the saw frame, said brackets pivoting in planes parallel to the plane of said blade, said faces being adapted to partially encircle an object to be sawed and spaced to permit the saw blade to operate therebetween.

16. A cutting implement comprising a saw having a cutting blade supported in a frame, a guide means for said saw comprising semi-circular faced brackets pivotally attached to said frame, said guide means pivoting in planes parallel to the plane of said saw, said semi-circular shaped brackets facing each other and being disposed to substantially encircle an article placed therebetween and spaced to permit the saw to operate therebetween.

17. A guide means for a saw cutting implement having a cutting blade supported in a frame, said guide means comprising arcuate faced brackets, said brackets being disposed with one on each side of the saw blade, said brackets being spaced to permit movement of said saw blade between said arcuate faces, and said brackets being attached to said saw frame adjacent to said saw in a manner to permit pivoting in planes parallel to the plane of said blade, and a tension means between the said brackets and said frame to oppose pivoting of said brackets.

FRANK B. BRATEK.
ANDREW S. HARTANOV.